United States Patent

Knapton

[15] 3,654,489

[45] Apr. 4, 1972

[54] PULSE GENERATOR FOR A VARIABLE LOAD

[72] Inventor: James H. Knapton, Beaverton, Oreg.

[73] Assignee: Tektronix, Inc., Beaverton, Oreg.

[22] Filed: July 28, 1970

[21] Appl. No.: 58,883

[52] U.S. Cl. ..........................307/252 W, 307/107, 307/284, 328/32, 328/63, 328/67

[51] Int. Cl. ......................................H03k 3/57, H03k 17/72

[58] Field of Search ..............307/106, 108, 127, 284, 252 B, 307/252 J, 252 K, 252 L, 252 Q, 252 W, 293, 305, 268; 328/57, 67, 32, 63; 318/65, 257

[56] References Cited

UNITED STATES PATENTS

| | | | |
|---|---|---|---|
| 2,677,053 | 4/1954 | Nims, Jr. | 328/67 X |
| 3,337,755 | 8/1967 | Grabowski et al. | 328/67 X |
| 3,396,293 | 8/1968 | Harris | 328/67 X |
| 3,076,106 | 1/1963 | Douma | 307/106 |
| 2,605,449 | 7/1952 | Schrader | 328/67 X |
| 2,697,784 | 12/1954 | Blythe | 307/108 X |
| 3,417,266 | 12/1968 | Woolfson | 328/67 X |

OTHER PUBLICATIONS

Stout, Basic Electrical Measurements, p. 96 & p. 98–99, Prentice-Hall, Inc., 2nd Edition, 1960.

*Primary Examiner*—Donald D. Forrer
*Assistant Examiner*—L. N. Anagnos
*Attorney*—Buckhorn, Blore, Klarquist and Sparkman

[57] ABSTRACT

A transmission line is charged by means of a floating power supply and is discharged through a silicon controlled rectifier into a variable load. A second silicon controlled rectifier, disposed in shunt relation with the line, is employed for insuring pulse termination.

13 Claims, 1 Drawing Figure

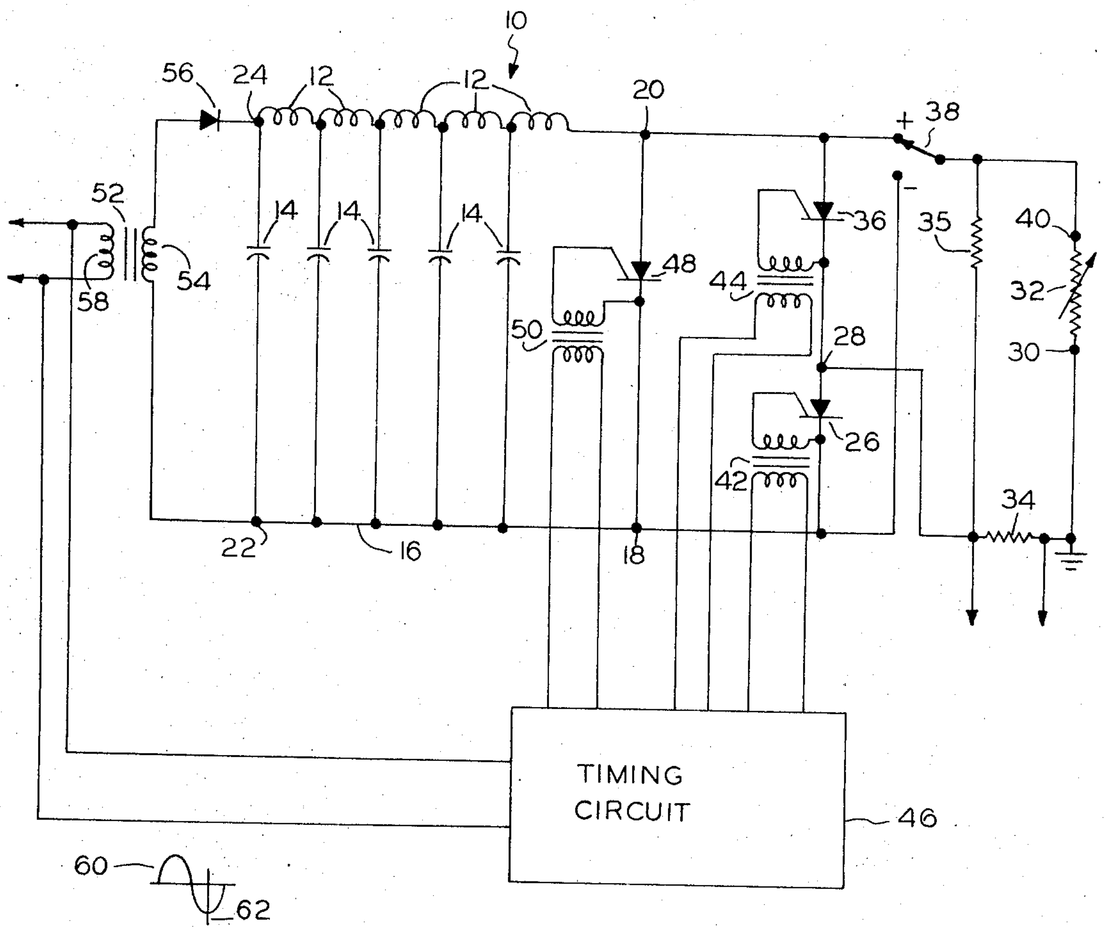
JAMES H. KNAPTON
INVENTOR
BY
BUCKHORN, BLORE, KLARQUIST & SPARKMAN
ATTORNEYS

PULSE GENERATOR FOR A VARIABLE LOAD

BACKGROUND OF THE INVENTION

Transmission lines are frequently employed for producing a pulse of predetermined duration. The transmission line is first charged for storing pulse energy and is subsequently discharged through switching means into a load. For high power applications, transistors or conventional vacuum tubes are not practical and consequently semiconductor switching devices, e.g. the silicon controlled rectifier type, are desirably utilized. Such a circuit operates predictably when the load is constant into which the transmission line discharges. However, for applications involving a variable or unknown load, operation of the transmission line pulsing apparatus may become erratic. For instance, a transmission line when lightly loaded may produce a pulse which does not terminate at the desired time. Also, a silicon controlled rectifier employed as a switching device between the transmission line and load may not shut off at a desired time when still delivering pulse energy from the line, and consequently the line may not have an opportunity to become recharged before another output pulse is required therefrom.

It is therefore an object of the present invention to provide an improved apparatus for delivering high power pulses to a variable load.

It is a further object of the present invention to provide a pulse of fixed duration substantially independent of the load to which such pulse is supplied.

It is a further object of the present invention to provide an improved apparatus for delivering high power pulses of selectable polarity.

It is another object of the present invention to provide output pulses to a load, wherein such pulse output is relatively unaffected by the charging cycle of a transmission line generating the pulse.

It is a further object of the present invention to provide an improved apparatus for producing high power output pulses for testing purposes, and wherein the current delivered is conveniently measurable.

It is another object of the present invention to provide an improved apparatus for generating high power output pulses, which apparatus is economical in construction, and supplies a substantially standard and predictable output pulse.

SUMMARY OF THE INVENTION

According to the present invention apparatus for supplying a high power pulse to a variable load comprises a transmission line which is charged by a floating power supply providing a charging path independent from the line's discharge circuit. Thus, waveform components representative of the charging cycle will not appear across the aforementioned variable load. A first semiconductor switching device is disposed in series between a terminal of the transmission line and a given terminal of the variable load for discharging the line into the load at a predetermined time. A second semiconductor switching device is shunted across the transmission line and is controlled for shunting the transmission line at the conclusion of the desired pulse, whereby the pulse will be terminated regardless of the impedance of the load. Also, current is diverted from the first semiconductor switching device, allowing the same to shut off, whereby the transmission line may recharge for another cycle of operation.

According to an embodiment of the present invention, means are also provided for reversing the polarity of the pulse delivered to the load. Such means suitably comprises a second semiconductor switching device disposed between another terminal of the transmission line and the given terminal of the load, together with reversing switch means for alternatively connecting a remaining terminal of the load to one or the other of a pair of transmission line terminals. Also, a sensing resistor is advantageously coupled in series with the variable load for indicating the load current, as when the present apparatus is employed for testing purposes.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawing wherein like reference characters refer to like elements.

DRAWING

The single FIGURE is a schematic diagram of a preferred embodiment of apparatus for supplying a high power pulse to a variable load, in accordance with the present invention.

DETAILED DESCRIPTION

Referring to the drawing, apparatus for supplying a high power pulse comprises a transmission line 10 which includes series connected inductances 12, and shunt connected capacitors 14 respectively interposed between inductance input terminals and line return 16. The transmission line also includes first and second output terminals 18 and 20 respectively connected to line return 16 and the output end of the last inductance 12. The transmission line is further provided with input terminals 22 and 24, respectively common with return 16 and the input terminal of the first inductance 12. A first semiconductor switching device, here comprising a silicon controlled rectifier 26, has its cathode connected to transmission line terminal 18 and its anode connected to a terminal 28 which is coupled to a first terminal 30 of variable resistance load 32 via current sensing resistor 34. Load terminal 30 is also herein illustrated as being grounded, but this ground connection is primarily illustrative for the purpose of establishing voltage polarities with respect to ground, and need not represent a physical connection to a chassis ground or the like.

A second semiconductor switching device, suitably comprising a silicon controlled rectifier 36, has its anode connected to transmission line terminal 20 and its cathode connected in common with the aforementioned terminal 28. Also, a reversing switch 38 alternatively couples second load terminal 40 to either transmission line terminal 18 or transmission line terminal 20. Switch 38, in conjunction with silicon controlled rectifiers 26 and 36, is employed for applying a particular polarity of output pulse to load 32. It is understood silicon controlled rectifier 26 will be operated only when switch 38 is in its upper or positive pulse position, and silicon controlled rectifier 36 will be operated only when switch 38 is in its lower or negative pulse position. Reversing switch 38 is shown schematically and may itself comprise a pair of alternatively operable silicon controlled rectifiers. Resistor 35 is disposed between terminals 28 and 40.

For the purpose of initiating conduction via the anode-cathode paths of silicon controlled rectifiers 26 and 36, rectifier 26 is provided with a gating transformer 42, the secondary of which is connected between the gate and cathode terminals of rectifier 26, while silicon controlled rectifier 36 is provided with a gating transformer 44 having its secondary disposed between the gate and cathode electrodes of rectifier 36. The primary windings of transformers 42 and 44 receive inputs for initiating conduction in the respective silicon controlled rectifiers in response to operation of a timing circuit 46, arranged for turning on either silicon controlled rectifier 26 or silicon controlled rectifier 36 at a predetermined time after transmission line 10 has been charged.

A third semiconductor switching means, suitably comprising a silicon controlled rectifier 48, has its anode connected to transmission line terminal 20 and its cathode connected to transmission line terminal 18. A gating transformer 50 is provided with a secondary winding coupled between the gate and cathode terminals of rectifier 48, while the primary of the gating transformer 50 receives its input from timing circuit 46 after the characteristic discharge time of line 10.

The present circuit is provided with a floating power supply which is substantially independent from the discharge circuit to the load, just described. This floating power supply has no common potential point with the load, other than being coupled in charging relation to the transmission line. The floating power supply comprises a transformer 52 having a secondary winding 54 one terminal of which is connected to transmission line terminal 22. The remaining terminal of secondary 54 is coupled via diode rectifier 56 to transmission line terminal 24, wherein the anode of diode 56 is connected to the secondary winding and the cathode of diode 56 is connected to terminal 24. Primary winding 58 of transformer 52 is powered from a standard 60 cycle alternating current line, and consequently diode 56 will provide a half wave rectified input between transmission line terminals 24 and 22. Thus, half cycles of such waveform will be provided to the transmission line input, wherein such half cycles are positive at terminal 24 with respect to terminal 22. Also, the input to timing circuit 46 is connected across primary winding 58 whereby circuit 46 can operate for discharging transmission line 10 in substantial synchronism with the 60 cycle input.

A single cycle of AC input is illustrated at 60 on the drawing. During the positive half cycle thereof, the transmission line 10 charges through diode 56. When the waveform crosses the zero axis, no more charging takes place and the line will be substantially charged to a predetermined level. Timing circuit 46 operates at a predetermined time during the negative half cycle of waveform 60, e.g. at the 270° point illustrated by vertical line 62, to initiate conduction through either silicon controlled rectifier 26, or silicon controlled rectifier 36. The timing circuitry in block 46 may be entirely conventional and is well known to those skilled in the art.

The characteristic charge time and discharge time of transmission line 10 is typically on the order of microseconds, in the case of the usual charge line formed from discrete inductances and capacitors. In a particular constructed embodiment of the present invention, the characteristic charge time and discharge time, or pulse time, for the transmission line, was on the order of 300 microseconds. Thus, the transmission line has more than adequate opportunity to fully charge during the positive half cycle of the alternating current wave applied. Then, at some time during the negative half cycle when the line is no longer charging, timing circuit 46 operates to place either silicon controlled rectifier 26 or silicon controlled rectifier 36 in conduction, dependent, of course, on the position also selected for switch 38. If, for example, switch 38 is thrown to its upper or positive position as illustrated, timing circuit 46 is directed by switching means (not shown) to initiate conduction in silicon controlled rectifier 26 at some point during the negative half cycle of the alternating current wave, through the medium of providing an impulse at the primary of gating transformer 42. The time for the initiation of such conduction is not particularly critical but should preferably be on the order of at least a millisecond before the conclusion of the negative half cycle of the alternating current input.

When conduction is triggered through silicon controlled rectifier 26, with switch 38 thrown to its upper position, the transmission line will discharge through load 32 providing a pulse thereto having a substantially fixed duration and a relatively constant amplitude for its duration. Of course, as hereinbefore mentioned, the variability of the load may tend to result in the delivery of an overlong pulse, as in the case when the load is of relatively large impedance compared with the characteristic impedance of the transmission line. However, according to the present invention, conduction of silicon controlled rectifier 48 is then initiated via gating transformer 50 at the end of the characteristic desired pulse time for the transmission line. Silicon controlled rectifier 48 shorts the line, eliminating the output pulse and discharging the line so that current in silicon controlled rectifier 26 falls to zero and silicon controlled rectifier 26 shuts off. Therefore, the extended conduction of silicon controlled rectifier 26 is avoided. The silicon controlled rectifier 48 turns off as soon as the transmission line 10 has sufficiently discharged. The whole process is repeated during the next cycle of the 60 cycle power line input.

Resistor 35 furnishes a light load so that silicon controlled rectifier 26 will have sufficient holding current to remain in conduction during the production of the pulse, in case the impedance of load 32 is not small enough for drawing sufficient holding current. Silicon controlled rectifier 48 is disposed across load 32 in series with silicon controlled rectifier 26, rather than simply across load 32, so that sufficient voltage will be available to turn on silicon controlled rectifier 48 when load 32 has low resistance and consequent low voltage drop. Of course, only a relatively small voltage drop will appear across silicon controlled rectifier 48 during the time the line is discharging.

Operation has been described in connection with the production of pulses for delivery to load 32 wherein such pulses are positive at terminal 40 relative to terminal 30. With switch 38 thrown to the lower position, the opposite polarity output is selected. Then, of course, operation of silicon controlled rectifier 36 is selected by switching means (not shown) associated with timing circuit 46. Circuit operation is otherwise the same as hereinabove described.

The circuit according to the present invention is suitably employed for testing various circuit elements by supplying a predetermined pulse thereto. Variable load 32 here represents the circuit element or the like under test and may comprise a transistor, the characteristics of which are being measured, or some other semiconductor device. The present circuit may be employed at various voltage levels and currents. For a particular transmission line employed, the pulse output was approximately 15 volts in the case of an open circuit between terminals 40 and 30, or 7 ½ volts at 100 amps, or 200 amps at zero volts when load 32 had zero resistance. These are only exemplary values in the wide range of possible outputs. Sensing resistor 34 is used to provide a voltage output proportional to the load current for measuring the same. Since the input charging or power supply circuit is independent of the discharge circuit, substantially no undesirable pulse output is provided at load 32 when transmission line 10 is being charged.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Apparatus for supplying a high power pulse to a variable load comprising:
   - a transmission line,
   - a discharge circuit coupling a pair of terminals across said transmission line to said variable load, said discharge circuit including controllable switching means in series between a first of said pair of terminals and a first terminal of said load,
   - power supply means for charging said line, said power supply means being coupled to said transmission line independently from said discharge circuit,
   - and second controllable switching means coupled directly across the said pair of transmission line terminals for terminating the pulse output of said line at a selectively predetermined time.

2. The apparatus according to claim 1 including means for reversing the polarity of the pulse provided at said variable load comprising additional controllable switching means disposed between a second transmission line terminal and the first terminal of said load, and switching means for alternatively connecting a second terminal of said load to either the first or second terminal across said transmission line.

3. Apparatus for supplying a high power pulse to a variable load comprising:

a transmission line provided with a pair of terminals connected thereacross, a discharge circuit for said transmission line comprising a first semiconductor switching device coupled in series between a first of said transmission line terminals and a first terminal of said variable load, a floating power coupling means for said transmission line, said power coupling means being independent of said discharge circuit, and a second controlled semiconductor switching device coupled directly between said transmission line terminals for concluding the pulse delivered to said variable load.

4. The apparatus according to claim 3 wherein said first and second semiconductor switching devices comprise silicon controlled rectifiers, said apparatus further including means for initiating conduction of the first such silicon controlled rectifier for delivering a pulse to said variable load, and for initiating conduction through the second silicon controlled rectifier at the end of such pulse.

5. The apparatus according to claim 3 further including an impedance of predetermined value permanently coupled across load terminals for providing a minimum load for said apparatus.

6. The apparatus according to claim 3 further including a current sensing resistor of known value in series with said load.

7. The apparatus according to claim 3 wherein said floating power coupling means comprises a transformer having a first winding coupled to a power source and a second winding coupled across said transmission line.

8. Apparatus for supplying a high power pulse to a variable load comprising:

a transmission line having at least a pair of terminals, a discharge circuit for said transmission line comprising a first silicon controlled rectifier disposed in series between one of said transmission line terminals and a first terminal of said load, a second silicon controlled rectifier coupled between the second transmission line terminal and the said first terminal of said load, and switching means for alternatively coupling a second terminal of said load to the first or second transmission line terminals, a third silicon controlled rectifier shunted across the said transmission line terminals for concluding the pulse output thereof, and a floating power supply for said transmission line comprising a transformer having a secondary winding coupled across said transmission line, and a rectifier in series between said secondary winding and said transmission line.

9. The apparatus according to claim 8 wherein said secondary winding is coupled to the opposite end of said transmission lines from said first mentioned pair of terminals.

10. The apparatus according to claim 8 further including control means for first initiating conduction in said first or second silicon controlled rectifier followed by initiation of conduction in said third silicon controlled rectifier, and means coupling said control means to the primary winding of said transformer for initiating the operation of said silicon controlled rectifiers on an opposite half cycle of an alternating current waveform employed for charging said transmission line through said transformer.

11. The apparatus according to claim 8 further including a resistor of predetermined value coupled in shunt relation with said load for providing a minimum load for said apparatus.

12. The apparatus according to claim 8 further including a current sensing resistor in series with said variable load.

13. The apparatus according to claim 8 wherein said switching means for alternatively coupling the second terminal of said load to said first or second terminals of said transmission line comprises alternatively operable silicon controlled rectifier means.

* * * * *